United States Patent Office 3,493,340
Patented Feb. 3, 1970

---

3,493,340
TREATMENT OF PHOSPHATE ORE
Wendell R. Bosen, Roger B. Humberger, Jack L. Smith, and Charles M. Davis, Pocatello, Idaho, assignors to J. R. Simplot Company, Boise, Idaho, a corporation of Nevada
No Drawing. Filed June 29, 1965, Ser. No. 468,107
Int. Cl. C01b 25/22; C01f 11/46
U.S. Cl. 23—165
14 Claims

ABSTRACT OF THE DISCLOSURE

A process for pretreating phosphate ore prior to the conventional sulfuric acid leach comprises calcining the ore and leaching with an acidic solution to preferentially dissolve magnesium impurities. The solution resulting from the pretreatment step, when the acidic leach solution contains carbon dioxide, can be mixed with waste effluent from the wet-process phosphoric acid plant to remove fluoride impurities.

---

This invention is concerned with a process for the treatment of phosphate ore or rock, and is of particular value for treating such ore prior to its conversion to phosphoric acid by the wet process.

More particularly, this invention is concerned with a process of leaching a comminuted, calcined phosphate ore with an acidic leaching solution, whereby principally the magnesium impurities in the ore are preferentially solubilized and dissolved in the leaching solution. Due to the calcination and comminution of the phosphate ore prior to the acidic leaching and by maintaining a control over the hydrogen ion concentration, i.e., pH, during the leaching and immediately prior to the separation of the solid, leached ore and the aqueous phase, solubilization of the phosphate values of the ore and the resultant loss from the system is minimized.

The phosphate ore, which is reacted with sulfuric acid to produce wet-process phosphoric acid and calcium sulfate (by-product gypsum), normally consists of a carbonate-fluorapatite $[Ca_{10}(PO_4)_6F_2CaCO_3]$, or a related mineral in association with various rocks. In the majority of instances magnesium is associated with the phosphate ore as dolomite, magnesite or directly substituted into the carbonate-fluorapatite crystal lattice. Thus, the digestion of the phosphate ore with sulfuric acid will solubilize the magnesium present and, due to the high solubility of the resulting magnesium salts, they remain in solution even during the concentration of phosphoric acid derived from such ore.

A simplified equation for the major reaction which occurs during the wet process is as follows: (1), (2), (3), (5)

(1) $Ca_5(PO_4)_3 + 5H_2SO_4 + 6H_2O \rightarrow 5CaSO_4 \cdot 2H_2O + 3H_3PO_4 + HF$ This major reaction is the total of a series of intermediate reactions and the wet process is more accurately characterized by the following:

(2) $Ca_3(PO_4)_2 + 3H_2SO_4 + 6H_2O \rightarrow 3CaSO_4 \cdot 2H_2O + 2H_3PO_4$ (3) $CaF_2 + H_2SO_4 + 2H_2O \rightarrow CaSO_4 \cdot 2H_2O + 2HF$ (4) $4HF + SiO_2 \rightarrow SiF_4 + 2H_2O$ (5) $3SiF_4 + 2H_2O \rightarrow SiO_2 + 2H_2SiF_6$ The impurities and carbonates associated in the fluorapatite will react in the following manner or an analogous manner:

(6) $CaCO_3 + H_2SO_4 + H_2O \rightarrow CaSO_4 \cdot 2H_2O + CO_2$ (7) $Fe_2O_3 + 2H_3PO_4 \rightarrow 2Fe^{+3} + 2PO_4^{-3} + 3H_2O$ (8) $Al_2O_3 + 2H_3PO_4 \rightarrow 2Al^{+3} + 2PO_4^{-3} + 3H_2O$ (9) $MgCO_3 + H_2SO_4 \rightarrow Mg^{+2} + SO_4^{-2} + H_2O + CO_2$

(10) $MgO + H_2SO_4 \rightarrow Mg^{+2} + SO_4^{-2} + H_2O$

While the above equations are representative of the reactions occurring during the digestion of the phosphate ore with sulfuric acid, the action of any strongly acidic material on the phosphate ore will be analogous. Thus, the reactions occurring during the acidic leaching step will be similar to the above, but, of course, of greatly decreased intensity. In essence, the success of the subject pretreatment process is dependent upon minimizing the extent to which reaction of type 2 occurs while maximizing the extent to which the magnesium is dissolved by its reaction as in Equations 9 and 10. That is, it is important that the maximum amount of magnesium is dissolved during the leaching by the formation of soluble salts, and that the minimum amount of phosphate is dissolved during the leaching and then separated in the aqueous phase.

The solubilization of the magnesium and phosphate ore has been found to be directly dependent upon the hydrogen ion concentration, i.e. pH of their solutions, in addition to certain other factors. Thus, in the subject pretreatment process, by utilizing close control over the pH of the leaching mixture of ore and aqueous material and close control over the final pH of the leached mixture of ore and aqueous material, it is possible to obtain a separation of a substantial portion of the magnesium impurities from the ore with the minimum loss of phosphate values from the system. A more detailed discussion of this is given below.

When wet-process phosphoric acid with an $MgO/P_2O_5$ weight ratio of greater than about 0.01 is used in the production of ammonium phosphate fertilizers, highly insoluble compounds are formed which result in loss of credit for phosphate. Such a loss of credit is very costly to the manufacturer. Also, when wet-process phosphoric acid with an $MgO/P_2O_5$ weight ratio greater than about 0.01 is used in the production of superphosphoric acid, and the superphosphoric acid is then used to produce ammonium phosphate solutions (by reaction with ammonia and water), objectionable sludges are formed in the solutions. These sludges consist primarily of magnesium ammonium pyrophosphates. The solids detract from the customer appeal of the product and cause handling difficulties in transport and application.

Treatment of magnesium-contaminated phosphate ore, in accordance with the subject process prior to its introduction into the wet-process phosphoric acid plant, results in the removal of a substantial part of and, under certain conditions, the majority of the magnesium impurities. Thus, the undesirable side effects, as noted above, are avoided or minimized. Treatment of the contaminated phosphate ore according to the subject process results in essentially no loss of phosphate values. Rather, in some cases, as explained more fully below, the subject pretreatment of the ore may increase the phosphate values of the ore. Additionally, the subject pretreatment process advantageously converts sulfides present into volatile hydrogen sulfide and dissolved sulfides, and hence, results in their removal from the ore before it reaches the phosphoric acid circuit. Thus the problem of chemical attack by sulfides on equipment such as rubber-lined impellers in the phosphoric acid circuit and the inhalation problem in the phosphoric acid plant are minimized.

An additional advantage of the removal of the magnesium and some calcium impurities is the savings effected in the amount of sulfuric acid needed for the conversion of the phosphate ore to phosphoric acid. This advantage applies to forms of the process where waste acids, such as plant water effluents or $CO_2$ are used, alone or in part, for the leach. The following savings of sulfuric acid illustrate this advantage. These results were calculated from data of a large number of leach experiments employing waste plant effluents or $CO_2$ and data on the average sulfuric acid requirement per ton $P_2O_5$ for converting 29.5–35% $P_2O_5$ phosphate rock to wet process phosphoric acid.

| Magnesium content of ore | Reduction in percentage of MgO in ore | Reduction in percentage of CaO in ore | Percent reduction in total $H_2SO_4$ requirement |
|---|---|---|---|
| Med. and low | 0.1–0.7 | 0.2–1.2 | 0.7–4.5 |
| High | 0.7–1.1 | 0.4–1.2 | 2.8–5.6 |

The prior art attempts to reduce the magnesium content of wet-process phosphoric acid have involved the addition of sufficient basic material to the final product acid to precipitate from the acid its magnesium content. Such a process naturally requires the use of large quantities of expensive basic material to neutralize the acid and to precipitate the magnesium impurities. Such a purification process is expensive and is justifiable only when a very pure phosphoric acid is a necessity.

Essentially, the subject process comprises the following steps to which a calcined, comminuted phosphate ore is subjected prior to its introduction into the digestor-reactor system of a conventional wet-process phosphoric acid process, in which it is reacted with sulfuric acid to produce phosphoric acid and a calcium sulfate:

(1) The calcined comminuted phosphate ore is contacted with a sufficient amount of aqueous acidic material to provide an equivalent amount of acid to react with the available basic material present, (2) This contact between the ore and aqueous acidic material is maintained within a range of pH values for the leaching mixture of ore and aqueous acidic phase of from about 1 to about 6.5 so that a substantial portion of the magnesium impurities are leached from the ore, (3) The pH value of the mixture of ore and aqueous phase is caused to attain a value of from 2.6 to about 7.5, (4) The leached ore is separated from the majority of the aqueous phase while the pH value of the mixture of the leached ore and aqueous phase is from 2.6 to about 7.5, (5) The separated aqueous phase, which contains the dissolved magnesium impurities, is rejected from the phosphoric acid process, and (6) The purified ore is then introduced into the digestor-reactor system for a wet-process phosphoric acid process, and low magnesium content phosphoric acid is recovered.

A clearer understanding of the new process for the purification of phosphate rock may be obtained from the examples given below, which disclose the presently preferred modes of carrying out this invention.

EXAMPLE I

Single stage leach with dilute mineral acid and constant pH

A phosphate rock sample was calcined at 1400–1475° F. It was then allowed to cool to about 250° F. and ground so that 65% of the particles would pass through a 200 mesh screen. This ground calcined rock contained 31.8–32.0% $P_2O_5$, 45.5% CaO and 0.65% MgO.

A slurry was prepared by mixing 80 grams of the above heated ore with 800 ml. of distilled water. This slurry had an equilibrium pH of about 10.98 and contained about 9.1% solids. A solution of sulfuric acid (6.104 N) was added to the slurry until the pH reached a value of 3.0. The pH of the slurry was maintained at 3.0±0.15 for one hour by the periodic addition of the sulfuric acid solution. At the end of this period, the resulting slurry was filtered and the separated products analyzed. This process was repeated two additional times, and the analytical data is as follows:

| Run No. | MgO in dried solids (percent) | Percent of total MgO removed | $P_2O_5$ in filtrate (p.p.m.) | Recovery of $P_2O_5$ in solids (percent) |
|---|---|---|---|---|
| 1 | 0.18 | 72 | 200 | 99.38 |
| 2 | 0.17 | 74 | 115 | 99.64 |
| 3 | 0.22 | 66 | 220 | 99.31 |
| Avg | 0.19 | 71 | 178 | 99.44 |

Acid consumption averaged 947 meq. (milliequivalent weights)/kilogram of rock treated. Magnesium removal averaged 228 meq./kg. of rock. The mole ratio of Ca/Mg in the filtrates averaged about 1.7. The filtrates contained considerable residual acidity.

EXAMPLE II

Single-stage leach with dilute mineral acid and varying pH

Twelve liters of water taken from the overflow of a wet-process phosphoric acid plant's tailings pond were placed in a vessel and stirred while 1,600 grams of pulverized, calcined ore were slowly added. The rock contained 32.0% $P_2O_5$ and 0.65% MgO. Stirring was continued for about ten minutes after the rock addition was completed. The slurry was then filtered and the aqueous phase was analyzed:

| | pH | $P_2O_5$ (p.p.m.) | MgO (p.p.m.) |
|---|---|---|---|
| Tailings pond overflow | 2.6 | 850 | 46 |
| Process filtrate | 7.2 | 40 | 220 |

Based upon the above data, the magnesium oxide concentration in the phosphate ore was lowered by 0.13% expressed as percent of rock fed. The $P_2O_5$ recovery, based on $P_2O_5$ fed with the rock, was in excess of 100% since some $P_2O_5$ in the tailings pond overflow was removed during the treatment of the rock.

EXAMPLE III

Single stage leach with carbonic acid

A slurry was prepared by mixing 200 grams of pulverized calcined phosphate ore with 2 liters of distilled water. The slurry was mechanically agitated for two hours while carbon dioxide gas was sparged beneath the surface of the slurry. The slurry was allowed to settle for about 15 minutes after termination of the carbon dioxide sparging and then decanted. A sample of the decantate and a sample obtained by filtering the decantate were analyzed as follows:

| | MgO (p.p.m.) | CaO (p.p.m.) | $P_2O_5$ (p.p.m.) | pH |
|---|---|---|---|---|
| Decantate | 880 | 985 | 35 | 6.25 |
| Filtered Decantate | 880 | 820 | | |

This ore contained 1.57% MgO prior to the above treatment, and it contained 26.2% $P_2O_5$ and 41.6% CaO. Its magnesium oxide content was lowered to 0.68% by the treatment, a reduction of better than 56% in the amount of magnesium present. From the above amounts of magnesium and calcium removed the corresponding equivalents of $H_2SO_4$ were calculated. The sulfuric acid requirement for producing $H_3PO_4$ from this rock was lowered by approximately 70 lbs. of 100% $H_2SO_4$ per ton of rock.

EXAMPLE IV

Single stage leach with carbonic acid

A sample of 667 gms. of phosphate rock that had been calcined in a fluo-solids roaster at 1450° F. and ground was slurried in 2 liters of distilled water saturated with $CO_2$. The feed rock contained 0.41% MgO and 32% $P_2O_5$, calcined basis. The 25% solids slurry was continuously agitated and an excess of $CO_2$ sparged into the slurry for 2 hours. The slurry was filtered. The product rock, dried basis, contained 0.16% MgO. The amount of $P_2O_5$ in the filtrate was negligible. The calculated concentration of magnesium in the filtrate was 833 p.p.m. MgO. Sixty-one (61) percent of the total magnesium in the rock was removed.

EXAMPLE V

Two stage countercurrent treatment with waste effluent from wet-process phosphoric acid plant A continuous two-stage pilot plant was set up which consisted of (1) a mixer-reactor and a separator (thickener) and (2) a mixer-reactor and a separator (thickener). These two stages were interconnected and operated in the following manner:

(a) The feed ore was fed into mixer-reactor No. 1 wherein it was leached with the separator acid from separator No. 2, (b) The slurry of leached feed ore and leaching acid from mixer-reactor No. 1 was fed into separator No. 1, wherein the leached ore and the leaching solution were separated. The separated solution was rejected from the system, (c) The separated leached ore from separator No. 1 was fed into mixer-reactor No. 2, wherein it was leached with dilute mineral acid introduced into the system at this point, (d) The slurry of leached ore and leaching acid from mixer-reactor No. 2 was fed into separator No. 2, wherein the leached ore and the leaching acid were separated. The separated acid was fed into mixer-reactor No. 1, wherein it functioned as the leaching acid in step (a). The separated ore, which had been twice leached with acid, is then, suitably introduced into the wet-process phosphoric acid system.

The above described pilot plant was continuously operated for a period of 48 hours under the following operating conditions:

Solids fed—pulverized, calcined phosphate rock
lb./hr__ 100
Liquid fed—"tailings pond water" (defined below)
gallons/min__ 3
pH of leaching acid from stage 2 _____ 4.1
pH of leaching acid from stage 1 (discard) _____ 7.5
System temperature _____° F__ 80

The magnesium oxide content of the feed ore was 0.72% while that of the treated ore was 0.48%. The rock contained 32.4% $P_2O_5$ and was a typical feed rock to a wet-process phosphoric acid plant. Thus, treatment by the above process gave a removal of 0.24% of the magnesium oxide or a 33.3% lowering of the magnesium oxide content.

EXAMPLE VI

Two stage countercurrent treatment at relatively low pH

The continuous two-stage pilot plant as described in Example V was used under the following operating conditions:

Solids fed—pulverized, calcined phosphate ore
(0.55–0.65% MgO about 32% $P_2O_5$) ___lb./hr__ 100
Acid fed—"recirculating" water (defined below)
plus added sulfuric acid ("recirculating water"
contained 225 p.p.m. $P_2O_5$ and 40 p.p.m. MgO)
gallons/min__ 3
pH of leaching acid from stage 2 _____ 2.4
pH of leaching acid from stage 1 _____ 4.5
System temperature _____° F__ 80

The magnesium oxide content of the feed ore was between 0.55% and 0.65% while that of the treated ore averaged 0.22%. Thus, treatment by the above process gave a lowering of between 60–66% of the magnesium oxide. The percentage of phosphorous pentoxide recovered in the treated ore was 99.82.

EXAMPLE VII

Two stage countercurrent treatment at relatively low pH

The continuous two stage pilot plant as described in Example IV was used under the following operating conditions:

Solids fed—pulverized, calcined phosphate ore
(0.57% MgO, 32.0% $P_2O_5$) _____lbs./hr__ 100
Acid fed—"recirculating" water (defined more fully
below) plus added sulfuric acid (recirculating
water contained 225 p.p.m. $P_2O_5$ and 40 p.p.m.
MgO) _____gallons/min__ 3
pH of leaching solution from stage 2 _____ 2.6
pH of leaching solution from stage 1 _____ 3.3
System temperature _____° F__ 80

The magnesium oxide content of the feed ore was 0.57%, while that of the treated ore was 0.24%. Thus, treatment by the above process gave a 5% lowering of the magnesium oxide content. The percentage of phosphorous pentoxide recovered in the treated ore was 100.07%.

The operation and economic success of the subject process is dependent upon a number of major factors, these are:

(1) The dissolution and removal in the separated aqueous media of the maximum practical amount of the magnesium impurities, (2) The retention in the solid phase of the maximum practical amount of phosphate values, (3) The use of minimal amounts of relatively inexpensive acidic materials.

Each of these major factors is highly dependent upon one another and the final process must provide a suitable balance between them. In addition, each of the major factors is highly dependent upon certain other critical factors or variables, as discussed below.

First, considering the dissolution and removal of the magnesium, this major factor is highly dependent upon the variables associated with two broad aspects, (1) that of dissolving the magnesium from the ore and (2) that of retaining the dissolved magnesium in solution. Critical factors associated with the dissolution of the magnesium impurities are the size of the ore particles, the conditions of calcination of the ore, the chemical degradation of the ore particles and the addition to the leaching solution of at least a chemically equivalent amount of acidic material to effect the formation of soluble magnesium salts. The retention of the dissolved magnesium in solution is dependent upon its solubility in the leaching solution.

Although a more thorough explanation of the preferred ranges of each of these critical variables is given below, the preferred ranges of these variables is as follows:
(a) the preferred range of particle size for the calcined phosphate ore is such that at least 60–70% will pass through a 200 mesh screen; however, the process can be employed with coarser grind rock; (b) the ore has preferably been calcined at a temperature of from about 1200° F. to 1550° F. for a period of from about 15 minutes to 2 hours; (c) since the chemical degradation of the ore is highly dependent upon the concentration of hydrogen ion, the preferred upper limit of the pH of the leaching mixture of ore and aqueous phase is a value of about 6.5, while the lower limit of the pH value is about 1; and (d) the addition of at least a stoichiometrically equivalent amount of acidic material to effect the formation of soluble magnesium and calcium salts from the labile magnesium and calcium present.

In rock calcined at the above temperatures, the labile magnesium is believed to be present in part as free MgO formed by the thermal decomposition of dolomite or magnesite. The required amount of acid and hence the minimum acidic material to rock ratio can be determined titrimetrically by adding a dilute, standardized acidic solution to a weighed, slurried sample of the rock until the pH drops to the desired value and remains at that value for fifteen minutes.

Second, considering the major factor of the retention of the maximum amount of phosphate in the solid phase, this is principally dependent upon the final pH of the leached mixture of the ore and aqueous media, i.e. the pH of the leached mixture immediately prior to its separation.

During the course of the leaching step, two principal factors are involved: (1) dissolution of the labile solid species along with some of the rock constituents by the acidic leaching solution, and (2) the solubility of the so formed salts. In the case of leaches with a weak acid, for example, $CO_2$ (carbonic acid) leaches, pH control is eased by the limited dissociation of the acid, which limits the hydrogen ion concentration. In the case of $CO_2$ this concentration is also limited by this gas's somewhat limited solubility. As the leach with a weak acid proceeds, a buffered solution of the acid and its metal salts is the result. In $CO_2$ leaches there is no appreciable, observable dissolution of $P_2O_5$, and there is substantial dissolution of MgO.

However, in general the process allows for limited dissolution of $P_2O_5$. Thus in the case of leaches with a dilute solution of a strong or moderately strong acid, pH control is necessary. There may or may not be dissolution of some $P_2O_5$ from the phosphate ore along with the dissolution of magnesium and other contaminants, depending on the lowest pH achieved in the leaching circiut. Where there is some $P_2O_5$ dissolution, advantage can be taken of factor (2) and the process operated, as shown herein, in such a way that further reaction with the rock results in a rise in pH and lowering of dissolved $P_2O_5$ to an acceptable value. Thus, when the final pH of the leached mixture is less than 2.6 the amount of dissolved phosphate in the separated aqueous phase will be such as to make the process unattractive from the operational and economic standpoint due to the loss of phosphate values from the leached ore. Also, if the final pH of the leached mixture is above a pH valve of about 7.5, the process is of decreased efficiency due to the limited solubility of magnesium in the aqueous phase. Thus, it is preferred that the final pH of the leached mixture of ore and aqueous phase have a value of from 2.6 to about 7.5.

Third, considering the amount and type of acidic material which may be used, the subject process is ideally designed so that only small amounts of inexpensive acidic materials are required. Thus, although acids such as phosphoric, hydrochloric and nitric could be used, it is preferred to use acidic material such as sulfuric acid, carbon dioxide, which may conveniently be obtained from the calcination of the original phosphate ore, and acidic solutions commonly associated with a wet-process phosphoric acid plant, inplant recirculation water or process water and gypsum pond overflow-water. As is illustrated in the above examples, essentially no excess of acidic material need be added and any slight excess that is added is neutralized by the basic material associated with the starting phosphate ore. Thus, the subject process does not require the addition of expensive basic materials to adjust the acidity of the mixture before separation of the impurities.

Calcination of the phosphate ore prior to the leaching step is an important step and has a direct relationship to the amount of magnesium impurities removed by the leaching. Moreover, the temperature of the calcination of the ore is critical in regard to the removal of the magnesium. As indicated below in Table I, a narrow range of calcination temperatures of the phosphate ore yields vastly improved removal of the magnesium impurities by the leaching process of the subject invention.

The following data in Table I is indicative of the relationship betwen the calcination temperature of the phosphate ore and the amount of magnesium, expressed as magnesium oxide, removed by the leaching process. This data was obtained using two different types of western phosphate ore, one of which was a high magnesium rock and the other a low magnesium rock.

TABLE I.—EFFECT OF CALCINATION TEMPERATURE ON MAGNESIUM REMOVAL

| Temperature of calcination (° F.) | Percent of total magnesium removed | | | |
|---|---|---|---|---|
| | $CO_2$, distilled water leach | | $CO_2$, reject water leach | |
| | Sample 1 [1] | Sample 2 [2] | Sample 3 [1] | Sample 4 [2] |
| Uncalcinated | 3 | 9 | 13 | 29 |
| 900 | 3 | 13 | | |
| 1,000 | 4 | | 8 | |
| 1,100 | 22 | 40 | 19 | 48 |
| 1,200 | 40 | | 32 | |
| 1,300 | 33 | 50 | 42 | 65 |
| 1,400 | 52 | 48 | 46 | 60 |
| 1,500 | 44 | 28 | 46 | 44 |
| 1,600 | 19 | | 26 | |
| 1,700 | 12 | | 20 | |
| 1,800 | 10 | 14 | 25 | 3 |
| 1,900 | 4 | | 8 | |

[1] High Mg rock—2.14% MgO and 26.2% $P_2O_5$ on calcined basis.
[2] Low Mg rock—0.44% MgO and 32.2% $P_2O_5$ on calcined basis.

For the above runs the dried, uncalcined rock was ground to 75% minus 200 mesh in the case of the high magnesium rock and 90% minus 200 mesh in the case of the low magnesium rock. Samples of the uncalcined, ground ore were leached as is. Other samples were calcined at the indicated temperature in a laboratory muffle for two hours with removal and mixing every thirty minutes. For the data of samples 1 and 2 the samples were then leached for two hours in accordance with the procedure of Example III, using a solution of carbon dioxide in distilled water as the leaching acid. For the data of samples 3 and 4 the same procedure was used except that tailings pond water was substituted for distilled water to give a combined acid leach ($CO_2$+the acid in tailings pond water).

The data in Table II is also indicative of the relationship between the temperature of calcination and the percentage of total magnesium removed during the leaching step. This data, also, provides an indication of the relationship between the fineness of the ground ore, the type of leach used and the amount of magnesium removed.

TABLE II

| Temperature of calcination, ° F. | Percent of rock [1] finer than 200 mesh | Percent of total magnesium removed by $CO^2$ leach | Percent of total magnesium removed by reclaim water +$H_2SO_4$ leach (pH 3.0) |
|---|---|---|---|
| 1,425 | 76.7 | 47 | 62 |
| 1,600 | 58.5 | 32 | 46 |
| 1,600 | 99.2 | 38 | |
| 1,800 | 55.4 | 12 | 13 |
| 1,800 | 74.0 | 16 | |
| 1,800 | 99.2 | 19 | |

[1] Low Mg rock, 0.34% MgO and 34.9% $P_2O_5$ on calcined basis.

In the above, the rock was calcined in a laboratory muffle before grinding for 90 minutes at the specified temperature with removal from the muffle and mixing every 30 minutes. A portion of the ore was ground to the specified fineness. Samples were leached by the procedure of Example III, using water continuously saturated with $CO_2$. Samples were also leached for 1 hour with agitation, 80 minutes total contact time, at 9.1% solids in a solution of plant reclaim water with supplementary addition of $H_2SO_4$ to hold the pH constant at 3.0±0.15 throughout the leach.

Thus, calcination of the phosphate ore prior to the leaching step is an important step and has a direct relationship to the amount of magnesium impurities removed by the leaching. Moreover, the temperature of calcination of the ore is critical in regard to the removal of magnesium. Although time and method of calcination may have some effect, the most important factor is the temperature itself. The method of calcination used for ores in Examples I, II, IV–VII above was with a fluosolids roaster, the temperature 1400–1500° F., the residence time in the hot zone of the roaster about 15 minutes.

The data of Tables I and II along with Examples I–VII show: (1) A substantial increase in amount of magnesium removed by leaching can be achieved by calcining the rock at the proper temperature. (2) Although the optimum temperature of calcination is somewhat dependent on the time and method of calcination, good results can be obtained by calcining at 1400–1500° F. in a fluosolids roaster as described. In general, the optimum temperature of calcination lies in the range of 1200–1600° F. (3) Good results are obtained with grinds of the ore to 65% finer than 200 mesh. A fine grind (small average particle size) is beneficial, but fine grinding does not completely overcome the loss in leachability due to calcination at excessively high temperatures.

Although we are not bound in our process by such theories, the effect of calcination can be explained as follows: When the ore is calcined at sufficiently high temperatures reactions 12 and 13 occur. Reactions 12, 13 and 14 require, in that order, progressively higher temperatures to occur (4), and the desired temperatures of calcination in applications of the process is that at which 12 and 13 occur, at least to some extent. Reaction 14 probably need not occur, but there is a gradation in the compositions of carbonates between those indicated by the below formulas:

(12)     $MgCO_3$ (magnesite) → $MgO + CO_2$

(13)    $MgCO_3 \cdot CaCO_3$ (dolomite) → $MgO + CaO + 2CO_2$

(14)     $CaCO_3$ (calcite) → $CaO + CO_2$

The results are (1) the formation of the strongly basic free magnesium oxide, which is very labile to reaction with acids, and (2) breakdown of crystals and hence possible increased porosity of minerals that contained the evolved $CO_2$, which further aids the leaching. Although we believe result (1) to be the most important, in addition, calcination burns off (oxidizes) most of the organic matter, and this may aid the leach. Further, lattice-bound magnesium in clays may become more available to an acid leach due to a thermal breakdown of the clay lattice.

However, if the calcination is conducted at too high a temperature a transition occurs that is evidenced by sintering. The transition converts the magnesium to a less available form. The nature of the conversion is unknown but may involve the localized fusion of CaO and MgO with silica or phosphate to form a calcium magnesium silicate or phosphate which is not readily soluble in acid and which has a low surface area. This effect determines the upper limit of calcination.

Thus, although the subject process can be effected with uncalcined ore or slightly calcined ore, better results are obtained when the starting ore has been calcined for a period of from about 15 minutes to about 2 hours at temperatures of from about 1200° F. to about 1550° F.

The effect of the pH of the leaching mixture (as evidenced by a determination of the pH before separation into solid and liquid constituents, i.e., "final pH") on the amount of calcium, magnesium, fluoride and phosphorous leached is shown in Table III below. These runs were effected by adding a sample of calcined phosphate ore to the leaching solution containing a measured amount of dilute sulfuric acid, leaching was effected, and the filtrate analyzed for CaO, MgO, F and $P_2O_5$.

TABLE III.—EFFECT OF pH ON LEACH SOLUTION ANALYSES

| Final pH (pH at end of leach) | Leach Solution Composition at End of Leach | | | | Initial milliequivalents/ liter $H_2SO_4$ added | Milliequivalents/ liter, $Ca^{+2}+Mg^{+2}$ dissolved |
|---|---|---|---|---|---|---|
| | CaO (p.p.m.) | MgO (p.p.m.) | F (p.p.m.) | $P_2O_5$ (p.p.m.) | | |
| 11.0 | 200 | 28 | | 0 | 0.0 | 8.5 |
| 9.09 | 480 | 130 | 11 | 30 | 18.4 | 23.5 |
| 7.59 | 840 | 220 | 6 | 20 | 27.0 | 41 |
| 6.82 | 1,180 | 260 | | 45 | 47.8 | 55 |
| 5.78 | 1,200 | 340 | 8 | 165 | 71.2 | 60 |
| 3.94 | 1,120 | 380 | 58 | 425 | 107.1 | 59 |
| 3.42 | 1,080 | 440 | | 830 | 133 | 59 |
| 2.93 | 840 | 440 | 146 | 1,300 | 144.1 | 52 |
| 2.49 | 100 | 460 | | 2,750 | 216.0 | 58.5 |
| 2.28 | 1,200 | 435 | 490 | 6,200 | 233.5 | 64 |

In Table IH the eventual leveling of calcium concentration with increasing acidity is attributed to the limited solubility of the calcium salts formed. The leveling off in concentration of magnesium in the leach solutions with increasing acidity was not due to limited solubility, for much higher concentrations of magnesium in solution have been achieved in similar leaches using higher magnesium content rock and operating at high per cent solids. Rather, there was a fraction of the magnesium in the rock that was unavailable to leaching with dilute acid; 66–75 percent of the magnesium was available and Table IV below shows that this maximum extraction was achieved with somewhat better recovery of $P_2O_5$ in the constant pH 3 runs than in which the solution was initially highly acidic. However, $P_2O_5$ recovery was good in the variable pH runs when the final pH's were sufficiently high. This data illustrates the importance of control of pH during the leaching step as affecting the amount of magnesium removal and amount of phosphorus loss.

The importance of the control of the pH during the leaching step as affecting the amount of magnesium removal and the amount of phosphorous removal is shown by the data in Table III, which is indicative of the criticality of the control and value of the pH during the leaching step.

Table IV compares the results of some of the runs of Table III in which all the strong acid was added to the system at the beginning of the leach with runs at constant pH. These results are discussed further below.

TABLE IV

| Initial pH | Final pH | Percent of total MgO removed | Percent of $P_2O_5$ recovered |
|---|---|---|---|
| [1] 3.0±0.15 | 3.0+0.15 | 66–74 | 99.3–99.65 |
| | 6.82 | 39 | 99.75–99.9 |
| [2] 1.51 | 5.78 | 51.5 | 99.4–99.5 |
| [2] 1.38 | 3.94 | 57.5 | 98.7 |
| [2] 1.24 | 3.42 | 67 | 97.3 |
| [2] 1.11 | 2.93 | 67–75 | 95.3 |

[1] Lowered to this value after rock added and held at this value during leach.
[2] Value before rock added.

For optimum results one important requirement is the addition of sufficient equivalents of acid to react with the available magnesium and calcium species. However, if a solution of a weak acid or buffered solution is used, this does not require a low pH. Thus, along with its being essentially a waste material, an advantage of $CO_2$ in solution as the leaching acid is that it is a weak acid giving substantial magnesium dissolution without dissolution of $P_2O_5$. Typical leach solution pH's in saturated $CO_2$ in water leaches at 1 atm. pressure $CO_2$ are 6.0–6.8. Degassing by application of reduced pressure or exposure to air causes a slight rise in pH. The $CO_2$ may be used in saturated solution at ambient pressures or, to increase the amount of dissolved $CO_2$ at higher pressures.

Leaches employing a very dilute solution of a strong acid require pH control to avert $P_2O_5$ losses. Example VI is a case where the percent removal of MgO by a $CO_2$ leach was comparable with that achieved by a strong acid leach, but the 1425° F. sample runs of Table II and other runs indicate that 5 to 20 percent more of the total magnesium present in the rock can be removed by a strong acid leach at pH 3.0 and with 60–80 minute leach times than with a 2 hours leach with $CO_2$ in saturated solution at ambient pressure.

In the case of leaches with dilute sulfuric acid solutions, the effect of pH of the leaching mixture on the amount of various constituents dissolved was investigated in two ways: (1) All the sulfuric acid used in the run was added to the water prior to addition of the rock and the pH was allowed to rise in the course of the leach. (2) Rock was added to the water and the leach slurry was brought down to a constant pH, in this case 3.0, and held at this pH during the leach by incremental additions of acid. The data of method (2) is that of Example I, the process in the form of a single stage strong acid leach at controlled, constant pH. Other forms of the process are intermediate between the two methods. In the case of a two stage countercurrent form of the process, as illustrated in Examples VI–VII, the pH is held at the value desired in the low pH stage by the continuous, controlled addition of acid. In these examples waste plant effluent or waste plant effluent plus sulfuric acid were use. In the case of Example VII $P_2O_5$ recovery was better than might be expected from the data by method (1) in Tables III and IV above. Nevertheless, the results by method (1) do show the trends of the effect of acidity on amounts of various constituents dissolved. The ore used for the series of tests by both methods (1) and (2) was the same as used in Example I; calcined at 1400–1475° F. in a fluosolids roaster, ground to 65% minus 200 mesh, 0.65% MgO, 45.5% CaO, 32% $P_2O_5$. Leach temperature was room temperature. Leach time was 60 minutes with agitation, 80 minutes total contact time. The solution to solids weight ratio was 10 to 1. In tests by method (1) the pH of the slurries rose very rapidly in the first ten minutes of leaching and only gradually thereafter. Results of the series of tests by method (1) are given in Table III. Results for both series, in Table IV.

Considering the process in its various forms, that is utilizing a weak or strong acid and employing a single stage or multiple stages with constant or varying pH, and considering the factors that it is desirable to affect the solution of magnesium to the greatest extent and the solution of phosphorous to the least extent, it is preferred to effect the leaching of the phosphate ore with a leaching solution of sufficient concentration so that the final pH is from 2.6 to about 7.5.

An increase in the leaching temperature of the phosphate ore with aqueous acidic material other than aqueous carbon dioxide has the desirable effect of increasing the efficiency of magnesium extraction, while decreasing the efficiency of the phosphate extraction. When the aqueous acidic material comprises added carbon dioxide the effect of increased leaching temperatures is to decrease the overall leaching efficiency. The effect of increased temperature with the use of carbon dioxide is, of course, complicated by its gaseous nature and its corresponding decrease in solubility with increasing temperature and decreasing pressure. The effect of increasing the leaching temperature is shown below in Tables V and VI. Even though the efficiency of the process is increased with an increase in temperature, because of factors of practicability, convenience and economy, it is preferred to operate at ambient temperatures.

The data below in Table V was obtained using a process similar to that used in Example 2. The initial calcined phosphate ore, 0.65% MgO, 32.0% $P_2O_5$, was leached with a sufficient amount of recirculating water to provide the necessary acid equivalents and pH and to give a mixture of ore and aqueous media having approximately 11.2% solids. This mixture was leached at the indicated temperature for 10 minutes and then allowed to settle for 10 minutes, whereupon the pH was measured and a portion of the decantate analyzed.

TABLE V

| Leaching temp. [° F.] | $P_2O_5$ [p.p.m.] | MgO [p.p.m.] | Final pH |
|---|---|---|---|
| 80 | 180 | 265 | 6.5 |
| 100 | 115 | 296 | 6.6 |
| 150 | 90 | 300 | 6.8 |

The data in Table VI was obtained using the same ore as above and in the manner of Example III with sufficient water to give an approximately 10% solids mixture, and with agitation, carbon dioxide was added at the indicated pressure and temperature for two hours. At the end of this period, the pH of the mixture was measured and then the solution resulting from a decantion separation analyzed and a portion of the decanted solution was filtered and this was also analyzed.

TABLE VI

| Leaching temp. [° F.] | Pressure of $CO_2$ [p.s.i.g.] | MgO [p.p.m.] decantate | filtrate | Final pH |
|---|---|---|---|---|
| 76 | [1] 14 | 478 |  | 6.3 |
| 200 | 50 | 60 | 52 | 7.4 |
| 200 | 100 | 63 | 62 | 7.3 |

[1] Ambient.

A variety of acidic materials may be used in the pretreatment process to provide the necessary equivalents of acid to solubilize the magnesium impurities. As suggested above, the preferred acidic materials are sulfuric acid, $CO_2$ and acidic solutions commonly associated with a wet-process phosphoric acid plant, in particular, acidic solutions of such a plant that are normally rejected as waste effluents. Such acidic solutions are referred to in the art and in this disclosure as "plant reject water," "tailings pond water" or "gypsum pond overflow," "plant recirculation water," "recirculating water" or "reclaim water," "fume scrubber water," and the less clear term "process water." They are defined below. Other acidic material, such as phosphoric, hydrochloric and nitric acid, may be used, and mixtures of the above acids may be used, such as carbon dioxide and recirculating water, sulfuric acid and tailings pond water, etc.

Tailings pond water or gypsum pond water is the acidic solution resulting from the settling of the slurry of water and washed gypsum in the gypsum pond. The water used to prepare the slurry with the gypsum is usually recirculation water. In-plant recirculation water, recirculation water, recirculating water or reclaim water is water that is used in barometric condensing of vapors from phosphoric acid evaporators and phosphoric acid plant vacuum coolers. This water is also used as the scrubbing liquor in fume scrubbers. The effluent from these condensers and scrubbers is collected, cooled and recirculated to be used again. Fresh water is added to the system continuously. This usually results in an excess amount which is rejected. Since these materials are rejected, recovery of values from them represents a net gain. They acquire their acidity by absorption of gases and gas entrained liquids and solids and also, in the case of tailings pond water, from residual acidity in the washed gypsum.

There is considerable variation in the composition of these effluents depending on manner of phosphoric acid plant operation. The range of concentrations of major constituents can be represented as follows:

500–5000 p.p.m. F—present mainly as fluorosilicic acid, $H_2SiF_6$, and fluorosilicates (some HF may be present in some cases)
120–1200 p.p.m. Si—present as fluorosilicic acid and fluorosilicates
100–5000 p.p.m. $P_2O_5$—present as phosphoric acid
100–5000 p.p.m. $SO_4$—present as sulfate
150–2800 p.p.m. CaO—present as calcium ion
Acidity: (1) pH—2.0–3.2; (2) normality (equivalents of acid per liter based on titration with base to pH 5.5 end point)—0.041–0.059
(Results for samples titrated to date.)

The titration curves for the effluents of pH vs. ml. base added are characterized by a flat region. The pH at which this flat zone occurs varies somewhat with the sample composition but has occurred within the pH range 3.0–3.9. Through this flat region the pH remains about constant with ml. base added and a precipitation reaction occurs. Calcium fluoride has been identified as a constituent of the precipitate.

Tailings pond water or gypsum pond overflow is thus a very dilute solution of phosphoric and fluorosilicic acids with some sulfate present. At least in some cases, some hydrofluoric acid, free fluoride, is present. (A minor amount of this "free fluoride" may be found in complexing the minor amount of Al and Fe present.) Calcium is the principal metallic constituent with magnesium and $R_2O_3$ elements present in much lesser amounts. Reclaim water or recirculating water is similar except that it generally contains less sulfate, $P_2O_5$ and calcium. In scrubber water fluorosilicic acid is again a major constituent. There is considerable variation in the analyses of these materials.

The wet-process phosphoric acid process is a well known method of producing phosphoric acid from phosphate ore by chemical means. In essence, the wet-process consists of reacting phosphate ore with sulfuric acid in one or a plurality of digestor-reactors, wherein the reactions outlined above are effected. The second principal step of the wet-process is the physical separation of the calcium sulfate, and the phosphoric acid. For this second step a variety of separation means have been proposed and used. These usually involve some sort of filtering means. After separation, the calcium sulfate is usually washed several times to remove adhering phosphoric acid. The phosphoric acid produced during the process is normally concentrated by removal of excess water. Further details of the wet-process and other information relevant to this disclosure may be found in such standard reference works as are cited herein.

(1) Van Wazer, J. R., Phosphorus and Its Compounds, vol. II, chapter 16, pp. 1025–69, Interscience Pub., Inc., New York (1961).

(2) Encyclopedia of Chemical Technology, R. E. Kirk and D. F. Othmer, ed., first ed., vol. 6, pp. 412–19, Interscience Encyclopedia, Inc.

(3) Waggaman, W. H., Phosphoric Acid, Phosphate and Phosphate Fertilizers, second edition, Reinhold Pub. Co. (1952).

(4) Taggart, Arthur F., Handbook of Mineral Dressing, pp. 3–15, 3–16, John Wiley (1945).

(5) Sauchelli, Vincent, Chemistry and Technology of Fertilizers, ACS Monograph No. 148, chapter 9, pp. 197–250, Reinhold Pub. Co. (1960).

(6) Latimer, W. H., Hildebrand, J. H., Reference Book of Inorganic Chemistry, pp. 274–277, revised edition, Macmillan, New York (1940).

(7) Klug, H. P., Brasted, R. C., Comprehensive Inorganic Chemistry, vol. 7, M. C. Sneed and R. C. Brasted, ed., pp. 44–47, Van Nostrand, Princeton, N.J. (1958).

(8) Simons, J. H., Fluorine Chemistry, vol. I, chapter 3 by W. Lange, pp. 127–133, Academic Press, New York (1950).

These above references have been referred to throughout the specification as indicated.

It has additionally been found that the solution separated from the leached ore, when carbon dioxide has been used as the added acidic material in the above process, is extremely valuable as a means for the recovery of valuable fluoride and phosphate values from, and as a means of reducing the acidity of the various phosphoric acid plant effluents, this additional aspect of the invention takes advantage of the properties of the plant wastes and of the separated aqueous media.

These phosphoric acid plant effluents, such as gypsum pond overflow water and discarded recirculation water are normally chemically treated to lower the fluoride content and the acidity and then discarded into river, evaporatory pond or stream.

The aqueous media, which is separated from the leached ore, when carbon dioxide is used as the added acidic material, contains appreciable quantities of magnesium and calcium in the form of their corresponding soluble bicarbonate salts. This separated aqueous medium is a convenient and economical source of calcium and, in addition, has a neutralizing effect upon the more highly acidic plant effluents.

Thus, it has been found that the treatment of phosphoric acid plant effluents with the separated aqueous leaching solution, resulting from the aqueous carbon dioxide pretreatment of phosphate ore, effects a reduction in the acidity of these effluents and, also, effects the precipitation and allows for the subsequent recovery of substantial quantities of the dissolved fluoride and phosphate values. The recovered phosphate values, principally in the form of calcium phosphate, may be reused in the phosphoric acid process. The recovered fluoride, principally as its calcium salts, is a potentially valuable commodity as it might subsequently be converted to such materials as hydrofluoric acid, aluminum fluoride or synthetic cryolite.

In essence, the subject process comprises mixing the two solutions, the plant effluent and the separated aqueous leaching solution, in sufficient quantities to provide the desired hydrogen ion concentration, i.e., pH of the resulting mixture. Alternatively the two solutions can be mixed and then the neutralization of the effluent completed by supplementary addition of base, the amount of such base required being materially reduced. If it is only to reduce the acidity of the plant effluents, the resulting mixture may then be introduced directly into the stream or river. If, however, it is desired to insure lowering of total fluoride (dissolved and solid) or to recover the fluoride and phosphate values, then the resulting insoluble fluoride and phosphate salts should be allowed to settle in a pond or separated with a thickener, centrifuge or filter and thus removed from the resulting aqueous material.

Calculations based upon titrations of those leach reject solutions with various plant effluents give an indication of the neutralizing capacity of these leach reject solutions. Based upon the average of these results of tests with leach reject from a $CO_2$ leach at 9.1% solids on a typical mill run rock, 1000 gallons of leach reject were equivalent to 9.1 lbs. NaOH or 8.3 lbs. $Ca(OH)_2$ for neutralization of effluents to pH 5.5. The neutralizing capacity of the leach reject of Example VIII exceeded this.

Examples VIII and IX illustrate the presently preferred mode of effecting the subject process.

EXAMPLE VIII

Nine hundred grams of ground phosphate rock were calcined at 1300–1330° F. for two hours in a muffle furnace. The rock was removed from the furnace during calcination and mixed every thirty minutes. Two hundred grams of this calcined rock, which contained 2.14% magnesium reported as magnesium oxide, 26.2% $P_2O_5$, 41.6% CaO, was mixed with two liters of water. An excess of carbon dioxide was bubbled into the agitated slurry for two hours. The solids were then separated from the leach solution by sedimentation and decantation under conditions to simulate those of Example 3 above. (The solution was siphoned off under conditions where −8 micron solids were included with the solution.) A portion of the decantate was filtered. The decantate assayed 617 p.p.m.

The data on fluorine and phosphate removal in the below tabulation were obtained by combining in 1:1 portions the indicated effluent and the above leach decantate. In two cases supplementary base was added. The combined solutions were stirred for 15 minutes and to the attainment of a constant pH. The solutions were allowed to stand for at least 30 minutes and then filtered. The filtrate was assayed for F, $P_2O_5$, CaO and, in one case, Si. The fluorine and $P_2O_5$ removal from solution was calculated from this, the ratio of final to initial volume and analysis of solutions before mixing. (Relative to the analytical error, the fluorine and phosphate concentrations in solution in the untreated effluents did not differ significantly from the total fluorine and phosphate concentrations.)

| Effluent | Final pH | Comment | Final Volume: Initial Vol. | Filtrate analysis, p.p.m. | Percent of total F removed | Percent of total $P_2O_5$ removed |
|---|---|---|---|---|---|---|
| (1) Tailings pond water [1] | [3] 3.0–3.3 | No sup. base | 2.00 | 210 F, 850 $P_2O_5$, [4] — CaO. | 69 | [4] 0 |
| (2) Same as 1 | 5.5 | Sup. based added (NaOH), base requirement reduced 42%. | 2.06 | 36 F, 900 $P_2O_5$, [4] 54 CaO. | 95 | [4] 0 |
| (3) Reclaim water [2] | 3.68 | No sup. base | 2.00 | 164 F, 300 $P_2O_5$, 186 CaO, 80 Si. | 68 | 38 |
| (4) Same as 3 | 6.17 | Sup. base added. Base requirement reduced 70% for neutralization to pH 5.5, 55% for neutralization to pH 6.17. | 2.04 | 12 F, 200 $P_2O_5$, 42 CaO. | 97–98 | 58 |

[1] Composition of Tailings Pond Water: 1,350 p.p.m. F; 293 p.p.m. Si, total; 284 p.p.m. Si, dissolved; 1,500 p.p.m. $P_2O_5$; 1,665 p.p.m. CaO, total; 1,200 p.p.m. CaO, dissolved; 90 p.p.m. MgO; acidity: pH 2.2–2.25; normality (equivalents acid per liter based on titration with base to pH 5.5 end point) 0.059.
[2] Composition of Reclaim Water: 1,015 p.p.m. F; 218 p.p.m. Si, total; 216 p.p.m. Si dissolved; 330 p.p.m. $P_2O_5$; 433 p.p.m. $SO_4$; 350 p.p.m. CaO; 38 p.p.m. MgO, 30 p.p.m. undissolved solids; acidity: pH 2.2; normality 0.041.
[3] Variable.
[4] $P_2O_5$ data somewhat in error here. $P_2O_5$ values in excess of maximum allowable for material balance.

MgO, and the filtrate assay for MgO agreed within analytical error. The filtrate contained 22.6 p.p.m. F and 20 p.p.m. $P_2O_5$. The solution was not determined for CaO but a similar run on the same rock calcined at 1475° F. yielded a decantate and filtrate with 985 and 820 p.p.m. CaO respectively. After standing, and immediately before use in neutralization of plant waste the pH of the separated leach solution was 6.97 (the pH had risen slightly due to some degassing of carbon dioxide). At this pH the magnesium and calcium were present in solution almost completely as their bicarbonate salts.

Equal volumes of gypsum pond overflow water and the above leach decantate were combined and analyzed. The results are given below.

| Sample | pH | Dissolved F (p.p.m.) | Dissolved $P_2O_5$ | F removed, percent | $P_2O_5$ removed, percent |
|---|---|---|---|---|---|
| (1) Gypsum pond overflow | 3.08 | 1,620 | 450 | | |
| (2) Leach decantate | 6.97 | 22.6 | 20 | | |
| (3) Calculated,[1] composition of 1:1 mixture of solus. 1 and 2 | | 822 | 235 | | |
| (4) Exp. determined, composition of 1:1 mixture of solus. 1 and 2 | 5.70 | 67.5 | 30 | 91.8 | 87.2 |

[1] The calculated values are F and $P_2O_5$ concentration of the aqueous mixture if no precipitation had occurred.

EXAMPLE IX

Two hundred (200) grams of the same calcined, ground phosphate ore used in Example I were leached at 9.1% solids using $CO_2$ and the decantate and filtrate separated in the same manner as in Example VIII. The feed rock contained 0.65–73% MgO, 32% $P_2O_5$ and 45.5% CaO; 44–51% of the total MgO was removed in the leach. (In a number of previous experiments the feed rock averaged 0.65%. In the work of this test the value obtained was 0.73%.) $P_2O_5$ recovery was 99.9–100.0%. The filtrate and decantate assays were as follows: 330 p.p.m. MgO, filtrate and decantate, 0 p.p.m. $P_2O_5$ filtrate, 35 p.p.m. $P_2O_5$ decantate; 110 p.p.m. CaO filtrate, 320 p.p.m. CaO decantate; 12 p.p.m. F filtrate, 18 p.p.m. F decantate; pH of decantate immediately after leach and before any degassing: 6.4; pH of decantate at time of below neutralization tests: 6.8.

Example VIII illustrates the neutralization and fluorine and phosphate removal achieved with a reject $CO_2$ leach solution obtained from a leach on a rock with a relatively high content of labile magnesium and calcium. Example IX is an example of results obtained when the ore was a typical mill run ore of low or medium labile magnesium and calcium content. In both cases the solutions were obtained upon leaching at relatively low percent solids. The neutralizing capacity of the reject leach solutions increases with the amount of labile (leachable) magnesium and calcium in the rock, and it also increases with the percent solids employed in the leach.

When $CO_2$ is used in combination with another acidic solution, such as tailings pond water, for the leach, the neutralizing capacity of the resulting reject solution is less than when $CO_2$ in deionized water or well water is used.

Example IX shows that removal of fluorine and phosphate from solution was accompanied by a decrease in calcium concentration in solution; in test 3 of the above tabulation some silicon was removed but the F/Si ratio in solution decreased. Other samples neutralized to pH 5.5 showed some silicon was removed from solution. Although the process is not dependent on theories to explain the nature of the precipitation of the fluorine and phosphate values, reactions of $Ca^{+2}$ with $H_2PO_4^-$, $HSO_4^-$, HF, $HSiF_6^-$, and $SiF_6^{--}$ to yield $CaHPO_4 \cdot 2H_2O$ (s), $CaSO_4 \cdot 2H_2O$ (s), $CaF_2$ (s), and $CaF_2$ (s) + $SiF_5(OH)^{--}$ (aq), respectively, would all result in precipitation as well as release of hydrogen ion and thus explain the flattening of the titration curves. The fluorine in the plant effluents is present to a large extent as fluorosilicic acid or fluorosilicates. Although we do not fully understand the precipitation reactions occurring, the data is consistent with the theory that the fluorine is not primarily precipitated as a fluorosilicate but, rather, that there is a stepwise replacement of fluorine from $SiF_6^{--}$ by hydroxyl groups from water with release of a hydrogen ion and precipitation of calcium fluoride. The insolubility of calcium fluoride acts as a driving force for the overall reaction. A final result of such replacements would be insoluble hydrous silica, but it is believed the replacement proceeds stepwise with rising pH and the silica is not precipitated to as great an extent in the early stages.

In any case, the presence of calcium in the solutions is beneficial to the process of removal of values from the effluents. Fluoride, phosphate and sulfate anions compete for the calcium. With effluents of ordinary analysis, at lower pH's (3–4) fluorine is removed somewhat in preference to phosphate and sulfate, but at higher pH's both fluorine and phosphate are removed. (We believe test 2 of the tabulation of Example IX is an exception to the more general case that there is some stripping of $P_2O_5$ from solution at pH 5.5. A similar test on this effluent adjusted to final pH 7.1 gave 44% removal of $P_2O_5$.)

In the course of a $CO_2$ leach, reactions that occur result in a $CO_2$ (carbonic acid)-calcium and magnesium bicarbonate buffered solution. In the process of neutralization of plant effluents more strongly acidic than the bicarbonate solutions, the following occurs:

(15) $H^+ (aq) + HCO_3^- (aq) \rightarrow CO_2 (aq \text{ or } g) + H_2O$

Since salts in solution are predominantly bicarbonates at the leach pH's employed (6), reaction 15 is the main neutralization reaction. Reaction 16 is minor and does not in general occur but can occur if the solution either contains some suspended $CaCO_3$ upon separation or becomes saturated upon a rise in pH due to decarbonation and some calcium carbonate forms.

(16) $2H^+ (aq) + CaCO_3 (s) \rightarrow Ca^{+2} (aq) + CO_2 (aq \text{ or } g) + H_2O$ If an excess of equivalents of bicarbonate over the equivalents of acid in the effluent is added in the neutralization, the final pH will exceed 4, the approximate pH of a saturated solution of $CO_2$ (carbonic acid) at 25° C., 1 atm., and, as shown in Examples VIII and IX, can be raised to 5–6.2 by adding sufficient amounts of the $CO_2$ leach reject solution or by adding supplementary base. A slight further rise in pH can be achieved by further decarbonating the solution through aeration or application of reduced pressure. The leach solutions themselves are not efficient in raising the pH of effluents above about 6.3, but this is not a serious objection for a pH of 5.5 is in general a sufficiently high pH for plant effluents, at this pH fluorine removal is at or near its optimum and in most cases some $P_2O_5$ removal has also been achieved.

If a deficiency of equivalents of bicarbonate to the equivalents of acid in the effluent is added, all the bicarbonate is consumed (converted to $CO_2$), and the amount of base required to raise the pH further is reduced as shown in Example IX. Degassing (decarbonation) of the mixed solutions by aeration or application of reduced pressure before the addition of supplementary base probably aids somewhat.

The exact amounts of plant effluent and separated $CO_2$ leach liquor to be mixed will depend upon the initial pH and equivalents of acid per unit volume in the effluent, upon the equivalents of bicarbonate per unit volume in the reject leach solution, upon the desired final pH of the mixture of these solutions, upon the rate of production of these streams and whether or not there is to be supplementary base addition. In situations in which the pH of the plant waste is to be adjusted to within legally prescribed limits, this will be a determining factor. In situations where it is desired to precipitate the fluoride and phosphate values, it has been found that the pH of the mixture of the effluent and separated leach liquid should be within the range of from about 3.1–3.8, where such precipitation becomes appreciable and is fairly selective toward fluoride, to 5–6.2 where more complete recovery of fluoride and phosphate is achieved. The quantities of the initial solutions to be mixed can be calculated from data obtained by (1) direct titration of the effluent with the reject solution, or (2) determination of equivalents of acid in effluent by titration with a strong base and determination of equivalents of bicarbonate in leach solution by addition of a measured excess of a standardized acid, boiling of the solution and back-titration with base. The fluoride and phosphate are precipitated predominantly as their calcium salts.

After the precipitation of the fluoride and phosphate, these solids, although finely divided, may be separated from the resulting aqueous media by any of the common separating means, such as sedimentation, filtration and centrifugation.

Thus, in the process, plant effluents such as tailings pond water can be used directly in leaching as described in Examples II and V–VII or such water can be treated with the reject leach solution from a $CO_2$ leach as described in Examples VIII and IX. In both cases there is complete or partial neutralization of waste plant effluents.

Various combinations of the methods described herein can be employed in the process. In particular, a plant effluent stream, such as gypsum pond overflow, can be split; one portion being used in a combined $CO_2$ plus plant effluent leach of the phosphate ore. The reject solution from this leach can then be combined with the other portion of the effluent stream thus providing fluorine and phosphate removal and complete or partial neutralization for this stream. Of course, the resulting reject leach solution of this combined acid leach is effective in neutralization only if it contains a substantial concentration of bicarbonate ions.

Further, the leach process can be operated in a continuous single stage or multiple stage manner that is countercurrent or not countercurrent. As a case appropriate to the treatment of a high magnesium phosphate rock, the ore can be leached by a $CO_2$ solution leach and the solids separated sharply from this first stage leach solution and transferred to a stage where they are subjected to a dilute strong acid leach, such as with plant reject water or this water plus sulfuric acid. The solids are taken from this stage to the phosphoric acid plant. The reject leach solutions from the two stages are combined, resulting in a rise in pH relative to the low pH solution and retrieval of some values.

We claim:
1. In a process for the preparation of phosphoric acid by the digestion and reaction of comminuted, calcined phosphate ore with sulfuric acid, the improvement which comprises the steps of,
  (a) contacting said comminuted, calcined phosphate ore, prior to its digestion and reaction with sulfuric acid, with a sufficient equivalent amount of aqueous acidic material to react with the available basic material present in said ore,
  (b) leaching a substantial portion of the magnesium impurities from said ore by maintaining contact between said ore and the aqueous acidic material at a pH value for the leaching mixture of said ore and said aqueous acidic phase of from about 1 to about 6.5,
  (c) causing the pH value of the mixture of ore and aqueous media to attain a value of from 2.6 to about 7.5,
  (d) separating the leached ore from the majority of the aqueous phase while the pH value of the mixture of leached ore and aqueous media is from 2.6 to about 7.5, whereby the majority of the dissolved magnesium impurities and a minimal amount of dissolved phosphate is separated from the ore,
(e) rejecting the said separated aqueous phase containing the dissolved magnesium impurities from the phosphoric acid process, and
(f) introducing the leached purified phosphate ore into the sulfuric acid digestor-reactor system of a wet-process phosphoric acid process, whereby said purified ore is converted into purified phosphoric acid.

2. The process of claim 1, wherein said aqueous acidic material comprises sulfuric acid.

3. The process of claim 1, wherein said aqueous acidic material comprises added dissolved and undissolved carbon dioxide.

4. The process of claim 1, wherein said aqueous acidic material comprises acidic effluents from a phosphoric acid plant.

5. A process for the preparation of purified phosphoric acid from phosphate ore which comprises the steps of
(a) calcining said phosphate ore by heating at a temperature of from about 1200° F. to about 1600° F. for a period of time of from about 15 minutes to about 2 hours,
(b) comminuting said calcined phosphate ore, so that about 60–70% of the ore will pass through a 200 mesh screen,
(c) contacting said comminuted, calcined phosphate ore with a sufficient equivalent amount of aqueous acidic material to react with the available basic material present in said ore,
(d) leaching a substantial portion of the magnesium impurities from said ore by maintaining contact between said ore and the aqueous acidic material at a pH value for the leaching mixture of said ore and said aqueous acidic phase of from about 1 to about 6.5,
(e) causing the pH value of the mixture of ore and aqueous media to attain a value of from 2.6 to about 7.5,
(f) separating the leached ore from the majority of the aqueous phase while the pH value of the mixture of leached ore and aqueous media is from 2.6 to about 7.5, whereby the majority of the dissolved magnesium impurities and a special amount of dissolved phosphate is separated from the ore,
(g) rejecting the said separated aqueous phase containing the dissolved magnesium impurities from the phosphoric acid process,
(h) introducing said leached ore into the digestor-reactor system of a wet-process phosphoric acid process and causing said phosphate ore to react with sulfuric acid to produce a mixture of phosphoric acid and calcium sulfate, and
(i) separating said mixture of phosphoric acid and calcium sulfate, whereby a purified phosphoric acid and a calcium sulfate is obtained.

6. The process of claim 5, wherein said aqueous acidic material comprises sulfuric acid.

7. The process of claim 5, wherein said aqueous acidic material comprises added dissolved and undissolved carbon dioxide.

8. The process of claim 5, wherein said aqueous acidic material comprises acidic effluents from a phosphoric acid plant.

9. In a process for the preparation of phosphoric acid by the digestion and reaction of comminuted, calcined phosphate ore with sulfuric acid, the improvement which comprises the steps of,
(a) contacting said comminuted, calcined phosphate ore, prior to its digestion and reaction with sulfuric acid, with a sufficient equivalent amount of aqueous acidic material comprising added dissolved and undissolved carbon dioxide to react with the available basic material present in said ore,
(b) leaching a substantial portion of the magnesium impurities from said ore by maintaining contact between said ore and said aqueous acidic material at a pH value for the leaching mixture of said ore and said aqueous acidic phase of from about 5 to about 6.5,
(c) causing the pH value of the mixture of ore and aqueous media to attain a value of from about 5 to about 7.5,
(d) separating the leached ore from the majority of the aqueous phase while the pH value of the mixture of leached ore and aqueous media is from about 5 to about 7.5, whereby the majority of the dissolved magnesium impurities and a minimal amount of dissolved phosphate is separated from the ore,
(e) rejecting the said separated aqueous phase containing the dissolved magnesium impurities from the phosphoric acid process, and
(f) introducing the leached purified phosphate ore into the sulfuric acid digestor-reactor system of a wet-process phosphoric acid process, whereby said purified ore is converted into purified phosphoric acid.

10. In a process for the preparation of phosphoric acid by the digestion and reaction of comminuted, calcined phosphate ore with sulfuric acid, the improvement which comprises the steps of,
(a) contacting said comminuted, calcined phosphate ore, prior to its digestion and reaction with sulfuric acid with a sufficient equivalent amount of aqueous acidic material comprising added dissolved and undissolved carbon dioxide to react with the available basic material present in said ore,
(b) leaching a substantial portion of the magnesium impurities from said ore by maintaining contact between said ore and said aqueous acidic material at a pH value for the leaching mixture of said ore and said aqueous acidic phase of from about 5 to about 6.5,
(c) causing the pH value of the mixture of ore and aqueous media to attain a value of from about 5 to about 7.5,
(d) separating the leached ore from the majority of the aqueous phase while the pH value of the mixture of leached ore and aqueous media is from about 5 to about 7.5, whereby the majority of the dissolved magnesium impurities and a minimal amount of dissolved phosphate is separated from the ore.
(e) rejecting the said separated aqueous phase containing the dissolved magnesium impurities from the phosphoric acid process,
(f) introducing the leached purified phosphate ore into the sulfuric acid digestor-reactor system of a wet-process phosphoric acid process, whereby said purified ore is converted into purified phosphoric acid, and
(g) mixing sufficient quantities of the rejected separated aqueous phase of step (e) with the waste aqueous effluent of a wet-process phosphoric acid plant to provide a pH value of from about 3.1 to about 6.2 for the resulting mixture of the solution, whereby the acidity and fluoride concentration of the said resultant mixture are substantially decreased and may be discharged into naturally occurring bodies of water.

11. In a process for the preparation of phosphoric acid by the digestion and reaction of comminuted, calcined phosphate ore with sulfuric acid, the improvement which comprises the steps of,
(a) contacting said comminuted, calcined phosphate ore, prior to its digestion and reaction with sulfuric acid, with a sufficient equivalent amount of aqueous acidic material comprising added dissolved and undissolved carbon dioxide to react with the available basic material present in said ore, (b) leaching a substantial portion of the magnesium impurities from said ore by maintaining contact between said ore and said aqueous acidic material at a pH value for the leaching mixture of said ore and said aqueous acidic phase of from about 5 to about 6.5, (c) causing the pH value of the mixture of ore and aqueous media to attain a value of from about 5 to about 7.5, (d) separating the leached ore from the majority of the aqueous phase while the pH value of the mixture of leached ore and aqueous media is from about 5 to about 7.5, whereby the majority of the dissolved magnesium impurities and a minimal amount of dissolved phosphate is separated from the ore, (e) rejecting the said separated aqueous phase containing the dissolved magnesium impurities from the phosphoric acid process, (f) introducing the leached purified phosphate ore into the sulfuric acid digestor-reactor system of a wet-process phosphoric acid process, whereby said purified ore is converted into purified phosphoric acid, (g) mixing sufficient quantities of the rejected separated aqueous phase of step (e) with the waste aqueous effluent of a wet-process phosphoric acid plant to provide a pH value of from about 3.2 to about 5.5 for the resulting mixture of solutions, and (h) separating the resultant insoluble fluoride and phosphate salts from the majority of the aqueous phase.

12. In a process for the manufacture of phosphoric acid by the wet-process in which the phosphate ore is pretreated by leaching with an aqueous acidic solution comprising added dissolved and undissolved carbon dioxide prior to the ore's introduction into the digestor-reactor system of the wet process, the improvement of reducing the acidity and fluoride concentration of the waste acidic aqueous effluent of the wet-process phosphoric acid plant, which comprises the step of, (a) mixing (1) a sufficient quantity of the aqueous leach solution resulting from the pretreatment leaching of the phosphate ore with an aqueous solution comprising added dissolved and undissolved carbon dioxide with (2) the waste acidic aqueous effluent of the wet-process phosphoric acid plant to provide a pH value for the resulting mixture of effluent and leach solution of from about 3.2 to about 6.5.

13. In a process for the manufacture of phosphoric acid by the wet-process in which the phosphate ore is pretreated by leaching with an aqueous acidic solution comprising added dissolved and undissolved carbon dioxide prior to the ore's introduction into the digestor-reactor system of the wet process, the improvement of reducing the acidity and fluoride concentration of the waste acidic aqueous effluent of the wet-process phosphoric acid plant, which comprises the steps of, (a) mixing (1) a sufficient quantity of the aqueous leach solution resulting from the pretreatment leaching of the phosphate ore with an aqueous acidic solution comprising added dissolved and undissolved carbon dioxide with (2) the waste acidic aqueous effluent of the wet-process phosphoric acid plant to provide a pH value for the resulting mixture of effluent and leach solution of from about 3.2 to about 5.5, and (b) separating the resultant insoluble fluoride and phosphate salts from the majority of the aqueous phase.

14. In a process for the manufacture of phosphoric acid by the wet process in which the phosphate ore is pretreated by leaching with an aqueous acidic solution comprising added dissolved and undissolved carbon dioxide prior to the ore's introduction into the digestor-reactor system of the wet process, the improvement of reducing the acidity and fluoride concentration of the waste acidic aqueous effluent of the wet-process phosphoric acid plant, which comprises the steps of, (a) mixing (1) a sufficient quantity of the aqueous leach solution resulting from the pretreatment leaching of the phosphate ore with an aqueous acidic solution comprising added dissolved and undissolved carbon dioxide with (2) the waste acidic aqueous effluent of the wet-process phosphoric acid plant to provide a pH value for the resulting mixture of effluent and leach solution of from about 3.1 to about 4.0, (b) mixing sufficient quantities of supplementary base with the partially neutralized mixture of effluent and leach solution of step (a) to provide a pH value of from about 5 to about 6 for the resulting solution, and (c) separating the resulting insoluble fluoride and phosphate salts from the majority of the aqueous phase.

References Cited

UNITED STATES PATENTS

| | | | |
|---|---|---|---|
| 1,944,048 | 1/1934 | Walker et al. | 23—165 |
| 2,433,458 | 12/1947 | Kahn et al. | 210—45 X |
| 2,885,266 | 5/1959 | Vickery | 23—165 |

OTHER REFERENCES

Van Wazer: Phosphorus and Its Compounds, vol. II (1961), p. 1205 relied on.

HERBERT T. CARTER, Primary Examiner

U.S. Cl. X.R.

23—122, 201.67; 210—42, 45